(12) United States Patent
Walker et al.

(10) Patent No.: US 11,020,620 B2
(45) Date of Patent: Jun. 1, 2021

(54) VEHICLE FIRE PROTECTIVE COVER (71) Applicants: Robert James Walker, Brisbane (AU); Matthew Robert Walker, Brisbane (AU)

(72) Inventors: Robert James Walker, Brisbane (AU); Matthew Robert Walker, Brisbane (AU)

(*) Notice: Subject to any disclaimer, the term of this patent is extended or adjusted under 35 U.S.C. 154(b) by 0 days.

(21) Appl. No.: 15/991,886

(22) Filed: May 29, 2018

(65) Prior Publication Data

US 2018/0345058 A1   Dec. 6, 2018

Related U.S. Application Data

(63) Continuation-in-part of application No. 13/699,209, filed as application No. PCT/AU2011/000600 on May 20, 2011, now abandoned.

(30) Foreign Application Priority Data

May 24, 2010 (AU) ................................ 2010902255

(51) Int. Cl.
*A62C 2/10* (2006.01)
*A62C 3/07* (2006.01)
(Continued)

(52) U.S. Cl.
CPC .................. *A62C 2/10* (2013.01); *A62C 3/07* (2013.01); *A62C 8/06* (2013.01); *B60J 11/04* (2013.01); *B60J 11/02* (2013.01)

(58) Field of Classification Search
CPC ... A62C 2/10; A62C 3/07; B60J 11/04; B62D 39/00

(Continued)

(56) References Cited

U.S. PATENT DOCUMENTS

| 4,216,989 A | 8/1980 | Tackett |
| 5,112,098 A * | 5/1992 | Lichtmann ............... B60J 11/00 |
| | | 296/136.07 |

(Continued)

FOREIGN PATENT DOCUMENTS

| CN | 2920723 | 7/2007 |
| FR | 2 543 891 | 10/1984 |

(Continued)

OTHER PUBLICATIONS

International Search Report dated Jul. 26, 2011 in PCT/AU11/000600 Filed May 20, 2011.

*Primary Examiner* — Jason J Boeckmann
(74) *Attorney, Agent, or Firm* — Merchant & Gould P.C.

(57) ABSTRACT

A fire protection external vehicle cover including a plurality of panels of a fire retardant material or textile. Each panel is configured to cover an adjacent portion of the cabin of the vehicle; with one or more panels including a retention mechanism to secure the panels by gripping between closed doors and door frames of the cabin. A storage and deployment mechanism is configured to store and deploy the cover from one or more locations on the vehicle; wherein in operation, when deployed, the cover forms an enclosure over the cabin thereby protecting external surfaces of the cabin and thus its occupants and an internal lining of the vehicle from exposure to radiant heat, burning embers and flames if the vehicle is moving through or becomes trapped in a fire.

19 Claims, 8 Drawing Sheets

(51) Int. Cl.
*B60J 11/04* (2006.01)
*A62C 8/06* (2006.01)
*B60J 11/02* (2006.01)

(58) Field of Classification Search
USPC .................................................. 169/48, 62
See application file for complete search history.

(56) References Cited

U.S. PATENT DOCUMENTS

| | | | |
|---|---|---|---|
| 5,176,421 A | | 1/1993 | Fasiska |
| 5,188,417 A | * | 2/1993 | Curchod ................. B60J 11/00 150/166 |
| 5,283,113 A | | 2/1994 | Nishimura et al. |
| 5,516,181 A | | 5/1996 | Thompson |
| 6,099,067 A | * | 8/2000 | Butterworth ............ B60J 11/00 135/88.05 |
| 6,193,225 B1 | * | 2/2001 | Watanabe ............... F16F 1/043 267/167 |
| 6,672,643 B1 | * | 1/2004 | Brodskiy ................ B60J 11/02 296/136.01 |
| 6,916,043 B2 | | 7/2005 | Rhea et al. |
| 7,008,002 B2 | | 3/2006 | Rhea et al. |
| 7,100,965 B1 | * | 9/2006 | Stover ..................... B60J 11/00 296/136.03 |
| 7,243,975 B2 | * | 7/2007 | Harcourt ................. B60J 11/00 296/136.01 |
| 7,311,112 B2 | * | 12/2007 | Pacheco .................. B60J 11/02 135/88.05 |
| 8,366,172 B1 | | 2/2013 | Morazan |
| 2007/0114812 A1 | | 5/2007 | Hunt |
| 2010/0007169 A1 | | 1/2010 | Nguyen |

FOREIGN PATENT DOCUMENTS

| | | |
|---|---|---|
| JP | 05171552 | 7/1993 |
| JP | 05195396 | 8/1993 |
| RU | 2 221 093 | 1/2004 |

* cited by examiner

VEHICLE FIRE PROTECTIVE COVER

CROSS-REFERENCE TO RELATED APPLICATIONS

The present application is a continuation in part of U.S. application Ser. No. 13/699,209, filed on Nov. 20, 2012 which is based on PCT Application No. PCT/AU11/000600, filed on May 20, 2011, and claims priority to Australian Patent Application 2010902255, filed on May 24, 2010, the entire contents of each of which is incorporated herein by reference.

FIELD OF THE INVENTION

This invention relates to a survival apparatus, in particular but not limited to, a fire protective cover for a vehicle used in controlling bushfires and forest fires.

BACKGROUND OF THE INVENTION

During wildfire events, natural disasters, or other catastrophes, vehicles may be exposed to extreme heat or flame impingement which may threaten the well being of occupants of those vehicles. Vehicles, especially fire agency, land management vehicles, and other emergency personal vehicles can become trapped in a 'fire storm' or 'burn over" during fire suppression operations or the like. In this regard, it is widely accepted, that protection of the vehicle cabin during these events can significantly increase survival expectation of the occupants thereof until the danger has passed.

Prior art reflective fire curtains presently available are fitted internally and fixed to the vehicle's cabin, and when not in use, rolled up and held in place above the cabin windows. Although they provide some degree of protection from heat and flame impingement, in an emergency fire situation they provide no external protection for the glass which is exposed directly to heat and flames, resulting in breakage. It is imperative that in such a situation the glass is kept intact, so as to maintain the oxygen levels within the cabin and to prevent the entry of toxic fumes, such as smoke and other toxins that may be present in the air as a result of the fire.

Presently, in an attempt to solve this problem, an external water spray system above the windows is installed, which can be inefficient due to the prevailing weather conditions or strong thermal currents caused by the fire, which often deflect the protective spray away from the windows. Moreover, to implement this solution, a large reservoir of water is obviously required, which is not easily adapted for use with general vehicles, such as people movers, mobile homes, trailers and the like. Lastly, the requirement that approximately 25% of the total water capacity of a fire fighting vehicle be retained for this use adversely impacts the primary fire suppression role and operational capacity of a fire fighting vehicle:

The lack of protection of the external surfaces exposes these surfaces of the cabin to intense heat, which is transferred through the doors, roof and other sections of the vehicle to the internal cabin linings. Moreover, these internal cabin linings are often made from plastic-based materials which can generate toxic gases detrimental to the survival of the occupants during the period of exposure.

Current fire protection curtains are held in position usually by riveting, by using press studs or using adhesive backed Velcro to secure the material to the cabin or internal vinyl trim. These methods, however, can involve a significant amount of time and effort for trained technicians to install. Furthermore, they can be inefficient and become compromised during exposure to an intense fire, due to deformation and degradation of materials.

Current fire protection curtains which are stowed internally present a safety issue because of their tendency to obstruct a driver's vision. Their effectiveness and use can also be limited relevant jurisdictional vehicle safety standards.

STATEMENT OF INVENTION

In one aspect the invention resides in a fire protection external vehicle cover that withstands being exposed to a temperature of at least 600° C. during part or the entire duration of a burn over event to protect occupants in a vehicle from physical injury or death for a minimum of 20 minutes from radiant heat, burning embers and flame impingement infiltrating the cover from a fire during a burn over event when the vehicle is stationary in the fire for the duration of the burn over event to protect occupants in a vehicle, the cover comprising:

a plurality of reflective panels of a heat dissipating and/or thermal insulating material or textile; each panel configured to cover a portion of the cabin of a vehicle to provide protection, from radiant heat, burning embers and flame impingement from the wild fire contacting the reflective panels, to the occupants of the vehicle and to glass sections of the vehicle from shattering under intense heat when the vehicle is stationary in the fire for the duration of the burn over event, the plurality of panels including a base panel having dimensions that correspond to the roof of the vehicle cabin, one or more side panels having dimensions that correspond to the side of the vehicle cabin which are connected to opposing sides of the base panel, the side panels adapted to extend over opposed sides of the vehicle cabin such that the cover confirms to the shape of the cabin;

a retention means, including straps or tags, which extends between and connects adjacent panels; the retention means are accessible by an occupant within the cabin to secure and adjust the panels against the cabin;

storage and deployment means for storing and deploying the cover from one or more locations on the vehicle, wherein the storage deployment means comprises one or more containers mounted on a roof of the vehicle which stores the cover in a rolled up or folded up configuration;

wherein, when deployed, the panels are secured to the cabin by an occupant within the cabin gripping the straps or tags between a closed door and a door frame of the cabin and the base panels and side panels are tensioned by tightening the straps or tags from within the cabin such that each panel contacts the cabin and can be held taut against the cabin by the retention means to minimize gaps between the cover and the cabin to form an enclosure, wherein at least one portion of the panels overlaps with a portion of another of the panels, wherein the reflective panels are constructed from a fiber reinforced material, and wherein the fibers of the fiber reinforced material include para-aramid synthetic fibers, glass fibers, carbon fibers, silica fibres, aramid fibers, ceramic fibres, vermiculite fibres or any combinations thereof.

The fire protection external vehicle cover protects occupants in a vehicle trapped in a fire from physical injury or death for the duration of a burn over. Suitably, the fire protection external vehicle cover protects the occupants for a minimum of 20 minutes. More suitably, the fire protection external vehicle cover protects the occupants for a minimum of 2 hours. Even more suitably, the fire protection external vehicle cover protects the occupants for a minimum of 24 hours. Yet even more suitably, the fire protection external vehicle cover protects the occupants for a minimum of 72 hours.

The fire protection external vehicle cover is particularly suitable to protect occupants in a vehicle cabin having a predominantly steel and glass construction.

The fire protection external vehicle cover can withstand being exposed to a temperature of at least 600° C. during part or the entire duration of a burn over to protect occupants in a vehicle from death. Suitably, the fire protection external vehicle cover can withstand being exposed to a temperature of at least 900° C. during part or the entire duration of a burnover to protect occupants in a vehicle from death.

The fire protection external vehicle cover may maintain an average internal temperature of the cabin from 20-80° C. when exposed to part or the entire duration of a burn over event. Suitably, the average internal temperature of the cabin ranges from 30-70° C. More suitably, the average internal temperature of the cabin ranges from 40-60° C. Even more suitably, the average internal temperature of the cabin is maintained at approximately 50° C.

The panels may include a base panel and side panels.

The base panel may comprise a front window panel, a roof panel and a back window panel. Each of the front window panel, roof panel and back window panel may conform to the shape the respective vehicle part it is to cover.

The side panels may comprise front door side panels. The side panels may comprise rear door side panels. The front door side panels and the rear door side panels may correspond to the shape of the respective doors of the vehicle.

Each panel may be larger than the vehicle part it is to cover. For example, the front window panel may include excess material which extend to cover the vehicle cabin pillars on either side of the front window, the rear window panel may include excess material which extend to cover the vehicle cabin pillars on either side of the rear window or the roof panel may include excess material which extend over the sides of the roof. The excess material of each of these panels may form a flap that can be gripped between a closed door and a door frame to secure the cover to the vehicle. The excess material may protect weather seals along the vehicle frame from fire/flame damage. The excess material of the panels may include a flap that covers at least part of an adjacent panel. For example, the excess material on the side panels may extend beyond the non-hinged edge of the door to cover the adjacent vehicle cabin pillar.

The excess material may include an open cuff that is arranged to extend inward of an outer face of the side panel and overlay the outer face of the side panel to form an elongate opening. The open cuff may be configured to extend about and receive two or more edges of the vehicle door. This allows the panels to be secured to the door. The cuff may protect weather seals positioned along the internal edge of the door.

In one embodiment, the open cuff may be arranged to the receive the edge of the car door.

Ideally, the open cuff may be configured to extend about and receive the edges of the door, except for the edge of the door at which the door is attached to the frame of the vehicle.

The excess material may include the cuff and the flap such that the cover can be secured to the vehicle cabin using the cuff while the flap overlaps with an adjacent panel to provide protection between the panels.

At least one edge of the panels may include a gusset that connects to an adjacent panel. The gusset improves flexibility of the cover by providing fold lines to allow the cover to fold. The gusset may also minimise stress on adjacent panels by increasing the distance between these panels to allow the cover to be folded without abutting the edges of the two panels.

Suitably, the excess material on the panel extends about 50-80 mm along the perimeter of the panel. More suitably, the excess material extends about 60-75 mm along the perimeter of the panel. Even more suitably, the excess material extends about 75 mm along the perimeter of the panel.

In an embodiment, the cuff overlies an outer face of the side panel by about 75 mm.

Adjacent panels may be connected by a retention means such as a strap or a tag that is extendible into the vehicle cabin and is accessible by an occupant of the vehicle. The retention means may be used to adjust the cover against the vehicle cabin or body, for example, by either tightening or loosening the retention means. This allows an occupant of the vehicle to safety adjust the cover while under the cover.

The retention means extends between the roof panel and a side panel. Suitably, the retention means is secured to the excess material extending from each of these panels.

The retention means may be gripped between a closed door and door frame of the vehicle cabin or body.

The fire protection external vehicle cover may include openings to allow an occupant to see the external environment. The cover may include flaps to close the openings during a burn over. The flaps may be accessible by an occupant of the vehicle.

Preferably, the material or textile is a reflective single or multi-layered thermal insulating and/or heat dissipating fabric or other reflective material which, when deployed, protects the glass sections such as the windows and windscreen of the vehicle by preventing them from shattering under intense heat and also inhibits heat transfer through the doors, roof and other portions of the cabin from reaching the interior trim and plastic areas inside the vehicle. More preferably, the reflective material or textile that is a single or multi-layered thermal insulating and/or heat dissipating fabric or other material is constructed of a flexible and fibre reinforced material and has heat deflective properties. The reinforced material used in the present invention is not overly limited, as those skilled in the art would appreciate that any material having the ability to provide thermal insulating and/or deflective properties can be used. However, suitable reinforced materials include, but are not limited to, Kevlar fibres, glass fibres, carbon fibres, aramid fibres, ceramic fibres, vermiculite fibres, silica fibres and combinations thereof. Preferably, the reinforced material is silica fibres in the form of flexible woven silica.

The material preferably includes a metallised layer. The metallised layer may reflect at least 70 of radiant heat contacting its surface. Suitably, the metallised layer reflects 80-95% of radiant heat contacting its surface. More suitably, the metallised layer reflects about 95% of radiant heat contacting its surface.

The metallised layer may include aluminium film, aluminium foil or stainless steel foil which may be laminated or impregnated to the base material. In an embodiment, the material does not include a phase change material constituent that undergoes a phase transformation during a burn over. Difficulties with using a material having a phase change material constituent include significantly increasing the weight of the material and having the material unsuitable for storage in a rolled or folded configuration because rolling or folding can cause fracture lines, cracks or breaks in the phase change material.

The cover may be roll-able or fold-able.

The cover may be a one use-only item. In other words, the cover may not be suitable for re-use because the insulating properties/flexibility properties of the cover may deteriorate after being exposed to a burnover. Once exposed to the impinging flames of a burnover, the aluminium coating may delaminate or separate from the base material.

The material or textile used for the cover may have a density ranging from 400 to 2,000 gsm. Suitably, the density ranges from 470 gsm to 1,860 gsm.

The material or textile may have a thickness ranging from 0.2-5 mm. Suitably, the thickness ranges from 0.3 to 4 mm. More suitably, the thickness ranges from 0.5 to 3.5 mm.

The combined properties of the type, density and thickness of the material or textile imparts the mentioned protective properties to the fire protection external vehicle cover.

The reduction in heat transfer into the vehicle cabin potentially reduces any toxic fumes released by the linings and plastic surfaces of the cabin trim and upholstery.

Preferably there can be a clear heatproof portion of the panel covering the windscreen to allow vision when driving the vehicle, for example, through a fire storm.

In the alternative, there may be liftable portion or removable panel for this purpose.

Preferably, the storage and deployment means comprises one or more containers mounted on the roof of the vehicle which stores the cover in a rolled up or folded up configuration. In the alternative, the storage and deployment means can be mounted on another part of the vehicle.

Preferably, deployment is rapidly effected under gravitational means when the cover is released from the storage and deployment enclosures.

Preferably the retention means for the panels of the cover comprise straps or tags that can be secured between the door frames and the closed doors of the vehicle body.

Preferably, when deployed, panels can be further tensioned through the tightening the straps or tags, or use of tension drawstrings accessible from within the cabin.

Preferably, the panels overlap one another so that gaps do not exist to allow embers or heat from infiltrating the cover to affect the cabin.

Preferably the storage and deployment means may include mechanical aids to effect rapid deployment of the cover such as sliding, hinged, pivoting, springs and rotating lever arms or rollers to facilitate unfolding or unfurling of the panels and the positioning of the retention straps or tags between the doors and the door frames.

More preferably, where mechanical aids are used to effect deployment of an unfolding cover, torsion springs or a pneumatic system with varying strengths are used to assist in rapidly unfolding the panels in a successive, predetermined order to cover the vehicle. When stored, the panels are folded against the bias of the spring or pneumatic rams and retained in place in a storage and deployment container strategically located on the vehicle.

Preferably, where mechanical aids are used to effect deployment of the cover, the automatic deployment will be triggered by a mechanism accessible from within the vehicle, such as a manual switch, switching means or an automatic trigger based on a thermostat or fusible link responsive to ambient temperature operating a retaining pin or solenoid device. After deployment, the cover can be more securely retained through the use straps or tags that can be secured between the door frames and the closed doors of the vehicle.

BRIEF DESCRIPTION OF THE DRAWINGS

In order for the invention to be better understood reference will now be made to the accompanying drawings, wherein.

DETAILED DESCRIPTION OF THE DRAWINGS

Figure 1:
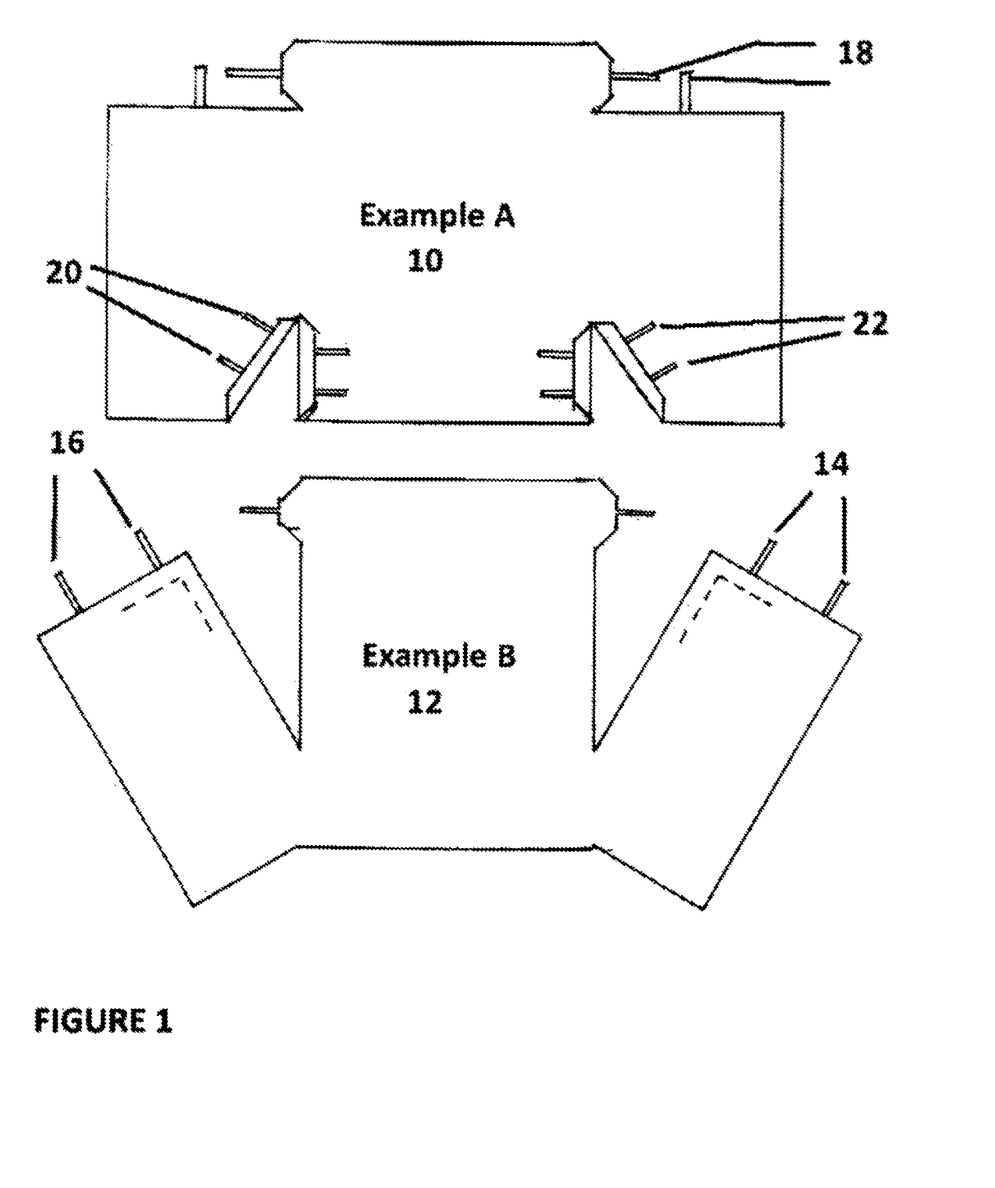
FIG. 1 shows the flat plane development of two preferred embodiments of the subject invention, according to Example A, 10 and Example B, 12.

Referring now to FIG. 1 there is shown Examples A, 10, and B, 12, which are embodiments of the subject invention intended to be deployed by unrolling or unfurling under gravity from externally mounted storage and deployment means on the vehicle (not shown). It will be noted the plurality of panels will be made from a reflective heat dissipating and/or thermal insulating material or textile. A preferred material is flexible woven silica. The material may also include a metallised layer 13 made from aluminium film, aluminium foil or stainless steel foil that is capable of reflecting about 95% of radiant heat contacting its surface (see FIG. 8). Additionally, the material has a density ranging from 474 gsm to 1,864 gsm and a thickness of 0.5 mm to 3.2 mm.

Each panel configured to cover an adjacent portion of the cabin of the vehicle (not shown). The straps or tags 14, 16, 18, 20, 22 provide for retention means to secure the panels by gripping between the shut doors and door frames of the cabin of the vehicle (not shown).

In one embodiment, the straps or tags 14, 16, 18, 20, 22 may extend between and connect adjacent panels to provide the retention means. The retention means is extendible into the vehicle cabin and is accessible by an occupant of the vehicle. The straps or tags may be used to adjust the cover against the vehicle cabin or body, for example, by either tightening or loosening the straps or tags. This allows an occupant of the vehicle to safety adjust the cover while under the cover.

It should be appreciated that the term "vehicle" used throughout the specification has the general meaning portrayed to the person skilled in the art. However, such is intended to also include, but not limited to, people movers or personal use motor vehicles, emergency personal vehicles, caravans, trailers, or any other vehicle or body that may be occupied by personnel, when they become trapped in a fire situation.

Figure 2A:
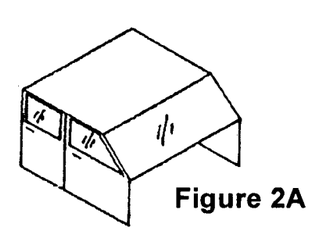
FIGS. 2A-E i to v progressively show the method by which Example A, 10, as indicated in FIG. 1, is mounted and deployed on the vehicle.
Figure 2B:
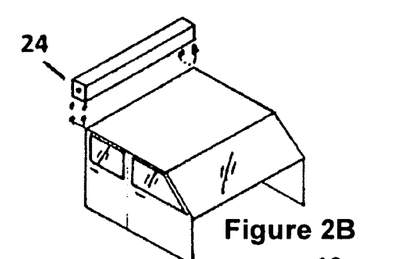

Referring now to FIG. 2A the general shape of a crew or single cabin area of a fire fighting vehicle is shown, with which the invention may be used. In FIG. 2B, the cover, A, 10, as depicted in FIG. 1, is shown to be mounted onto the roof of the vehicle within an enclosed, hinge-lidded, elongated container 24. The container 24 is one example of a storage and deployment means designed to effect rapid deployment of the cover.

Figures 2C, 2D:
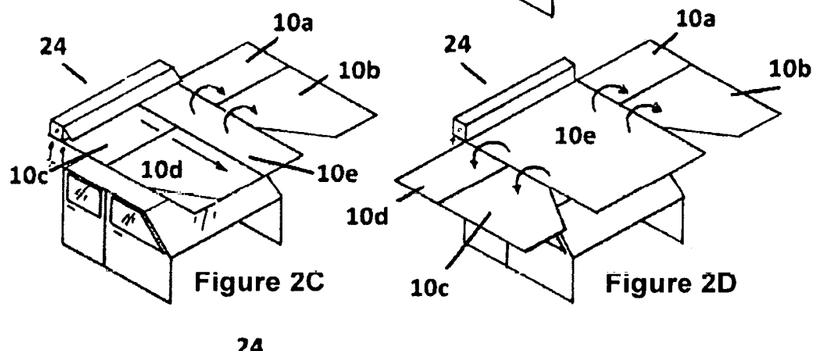

In FIGS. 2C and 2D, Example A 10 is shown to have unrolled and unfurled from storage and deployment container 24. Panels 10a, 10b, 10c and 10d are shown to have unfolded from their position above base panel 10e. In the interests of clarity, the straps or tabs which provide for retention means are not shown.

Figure 2E:
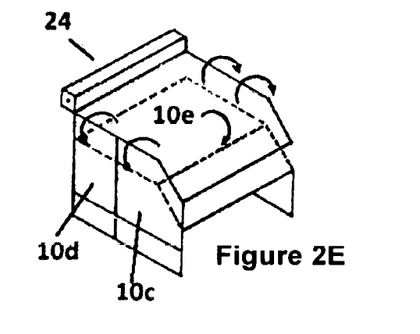

It will be noted from FIG. 2E, that when Example A 10 is deployed, panel 10a will overlap with panel 10b, panel 10c will overlap with panel 10d, panel 10c will overlap with panel 10e and panel 10b will overlap with panel 10e. The fire protective cover will take a substantially rectangular shape encompassing or enclosing the cabin or body section of a vehicle, thereby protecting the cabin or body and its occupants from exposure to radiant heat, burning embers and flames. It will be obvious that the shape and dimensions of the panels will correspond to the type and make of the vehicle for which the cover is intended.

Figure 3:
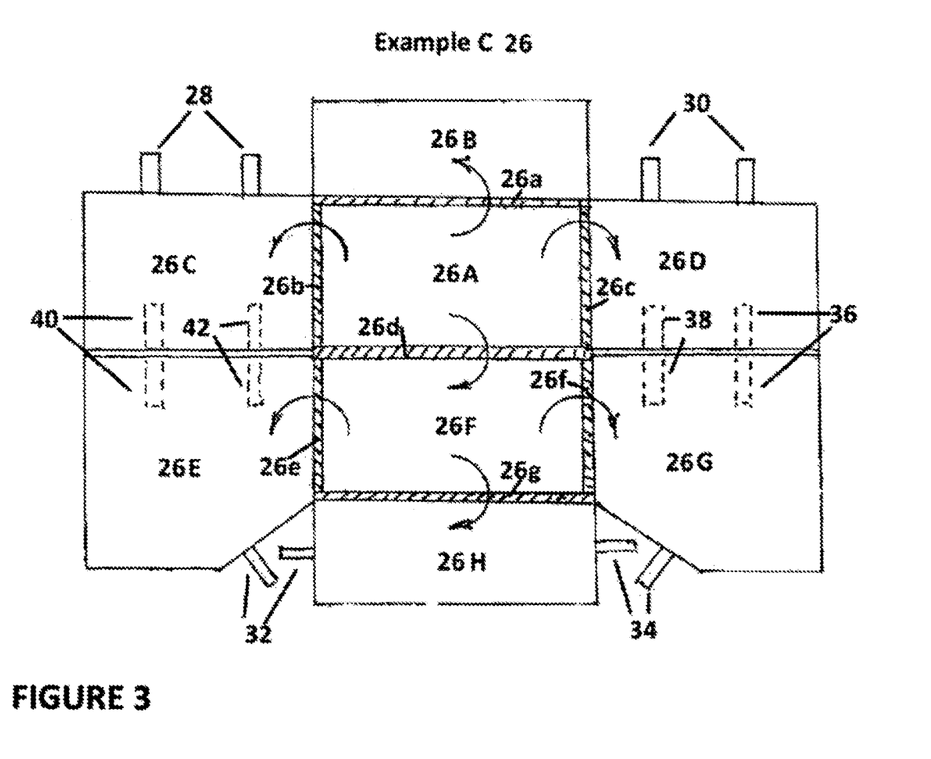
FIG. 3 shows another embodiment of the subject invention, Example C, 26.

Referring now to FIG. 3 there is shown another preferred embodiment of the subject invention, Example C which is intended to be deployed by unfolding out from a compact arrangement (not shown). It will be noted the plurality of reflective panels intended to be made from a heat dissipating and/or thermal insulating material or textile, each panel configured to cover an adjacent portion of the cabin of the vehicle (not shown).

26 a-g indicate the location of torsion springs, which is one example of a mechanical aid used to effect deployment of an unfolding cover. These torsion springs may be selectively varying strengths to assist in rapidly unfolding panels 26B, 26C, 26D, 26E, 26F, 26G and 26H in a successive, predetermined order from base panel 26A to cover the vehicle (not shown). When stored, the panels are folded against the bias of the springs and retained in place in a storage and deployment container strategically located on the vehicle (not shown). Automatic deployment of the cover is preferably triggered by a mechanism accessible within the vehicle such as a manual switch or an automatic trigger based on a thermostat or fusible link responsive to ambient temperature (not shown) operating a retaining pin or solenoid device (not shown).

While in the above explained embodiment reference is made to torsion springs as a preferred deployment mechanism, it shall be appreciated that other known mechanical deployment mechanisms can be used without departing from the spirit of the present invention. In particular, it is envisaged that a pneumatically powered system could be used to impart rapid deployment of an unfolding cover of the present invention. Additionally, a compressed air deployment system, mechanical gearing, electric motors and hydraulic energy are other examples of systems that could be adapted to impart rapid deployment of the cover of the present invention.

In use and after deployment of the cover, straps or tags 28, 30, 32, 34, 36, 38, 40, 42 may be used to further secure the panels by gripping between shut doors and door frames of the cabin of the vehicle (not shown).

Figure 4:
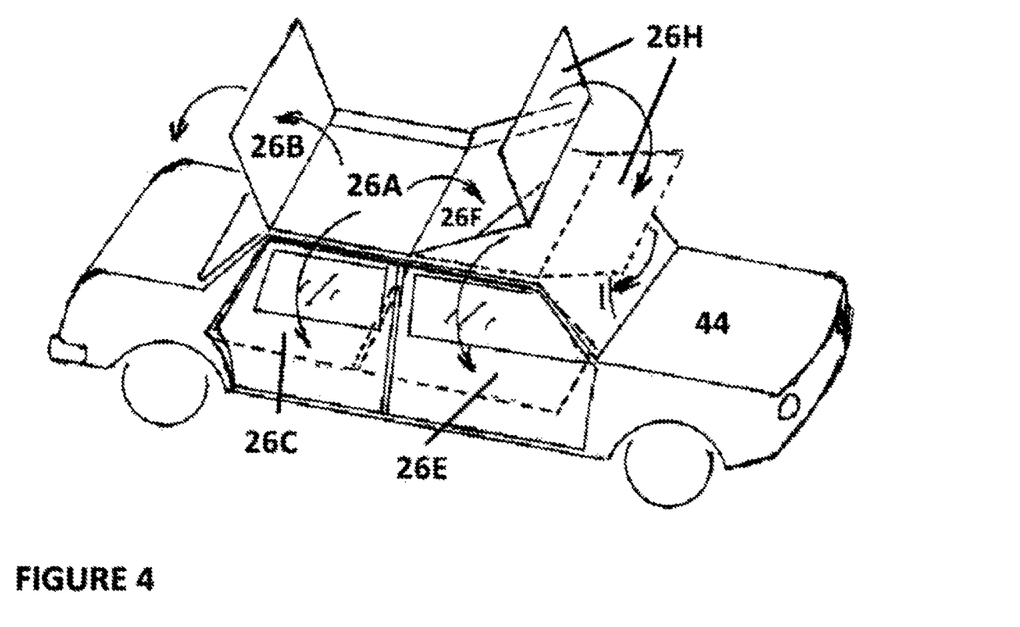
FIG. 4 indicates the method by which Example C, 26, is mounted and deployed on the vehicle.

Referring now to FIG. 4 there is shown one example of a shape of a vehicle 44, The cover, C, 26, is shown to be mounted (method not shown) onto the roof of the vehicle 44. Obviously the shape and dimensions of the panels will correspond to the type and make of the vehicle for which the cover is intended to be used with. Panels 26B, 26C, 26E, 26F and 26H are shown to be unfolding from base panel 26A. Panels 26D and 26G also unfold from base panel 26A, but are not shown. In the interests of clarity, the straps or tabs which provide for the retention means are not shown. Panel 26B will overlap with panel 26D (not shown), panel 26D (not shown) will overlap with panel 26G (not shown), panel 26G (not shown) will overlap with panel 26H, panel 26H will overlap with panel 26 E, panel 26D will overlap with panel 26C and panel 26 C will overlap with panel 26B. The fire protective cover of the present invention, in preferred embodiments, will take a substantially rectangular shape encompassing or enclosing the cabin section or body of the vehicle 44, thereby protecting the cabin or body and any of its occupants from exposure to radiant heat, burning embers and flames. It will be obvious that the shape and dimensions of the panels will correspond substantially to the type and make of the vehicle for which the cover is intended to be used with.

In all the above examples, the deployment is preferably triggered by a mechanism accessible within the vehicle, such as a manual switch or an automatic trigger based on a thermostat or fusible link responsive to ambient temperature (not shown) operating a retaining pin or solenoid device. During housing in the stored position for extended periods of time, the torsion springs may lose some tension, however it is envisaged that replacement springs may be installed when too much spring tension is lost. Moreover, other deployment mechanisms can be replaced if necessary during the life of the product.

Figure 5:
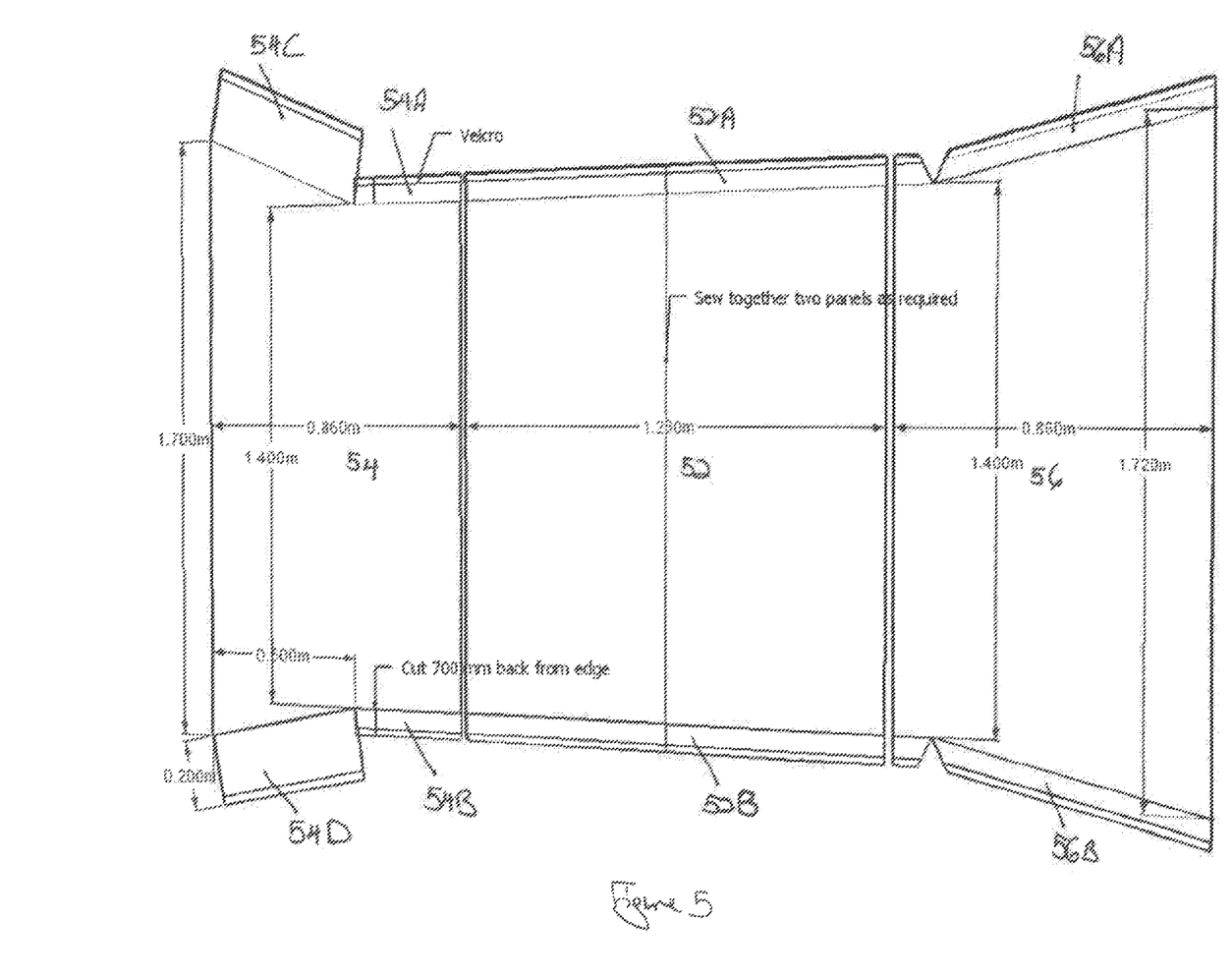
FIG. 5 shows a perspective front view of a base panel of the subject invention.

FIG. 5 illustrates a base panel 50 comprising a roof panel 52, rear window panel 54 and front window panel 56 which are joined together, for example by stitching. The roof panel 52 includes excess material in the form of flaps 52A and 52B which overlap the edges of the roof adjacent to the doors such that flaps 52A and 52B can be gripped between a closed door and a door frame. The rear window panel 54 includes flaps 54A and 54B which overlaps the edges of the rear window adjacent to the doors such that flaps 54A and 54B can be gripped between a closed rear door and the door frame. The rear window panel 54 further includes flaps 54C and 54D which cover the rear cabin "C" pillar. The front window panel 56 includes flaps 56A and 56B which overlap the edges of the front window adjacent to the front door such that the flaps 56A and 56B can be gripped between a closed front door and the door frame. Flaps 52A-B, 54A-B, 56A-B have a width of ranging from 70-700 mm. Suitably, the flaps 52A-B, 54A-B, 56A-B extend about 70-75 mm from the perimeter of the base panel 50.

Figure 6:
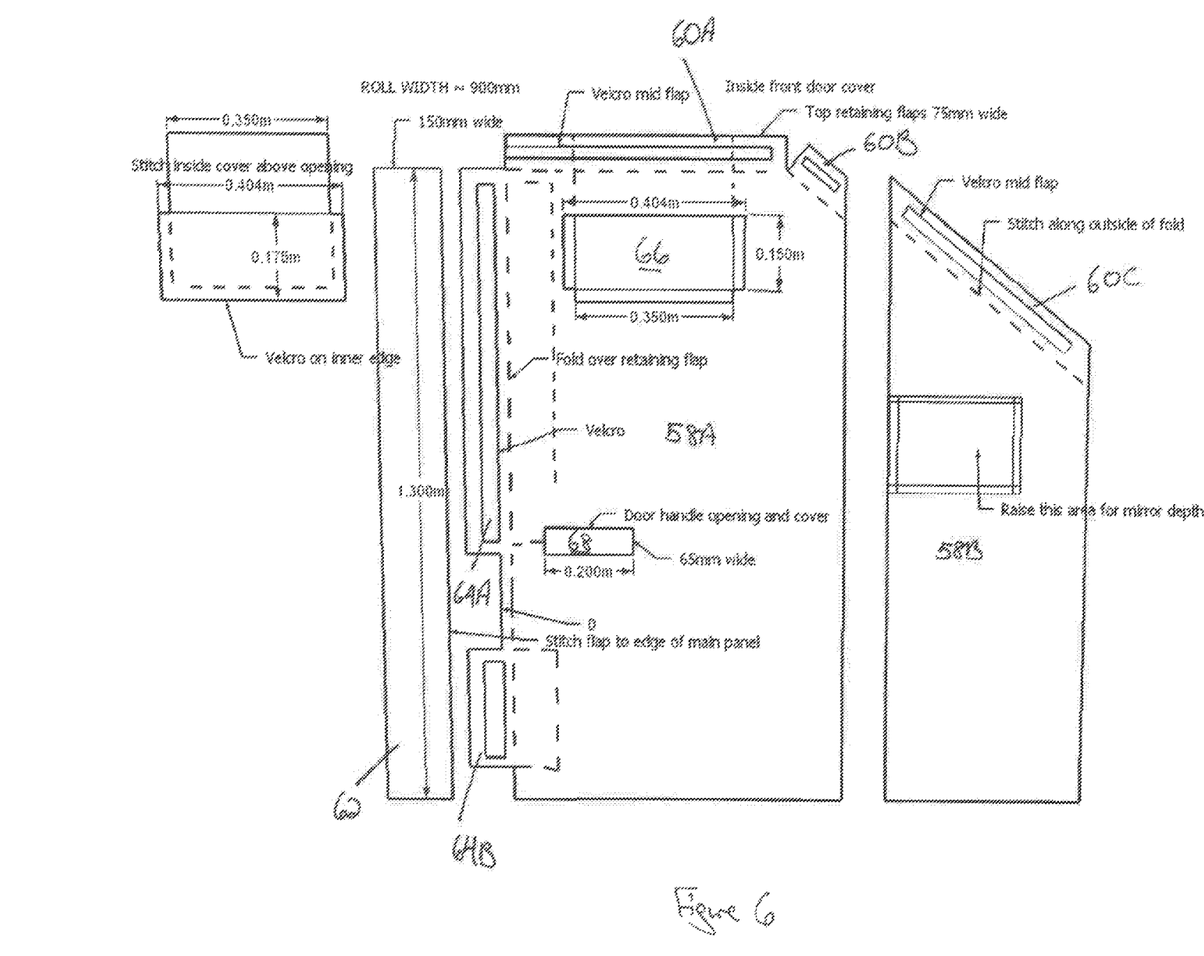
FIG. 6 shows an exploded view of a front door side panel that is attachable to the base panel of FIG. 5.

FIG. 6 illustrates a front door side panel 58 comprising front door panels 58A and 58B. Cuffs 60A-C of the front door side panel are securable to the upper edge of the front door. Panel 58A further includes cuffs 64A and 64B which are securable to the side edge of the front door and a flap 62 which extends beyond the side edge of the front door and overlaps the rear door panel. The cuffs have a width of about 75 mm.

Panel 58A includes opening 66 to allow an occupant to see the external environment and opening 68 to provide access to the door handle. These openings 66 and 68 are covered by flaps which are attachable to the side panel.

Figure 7:
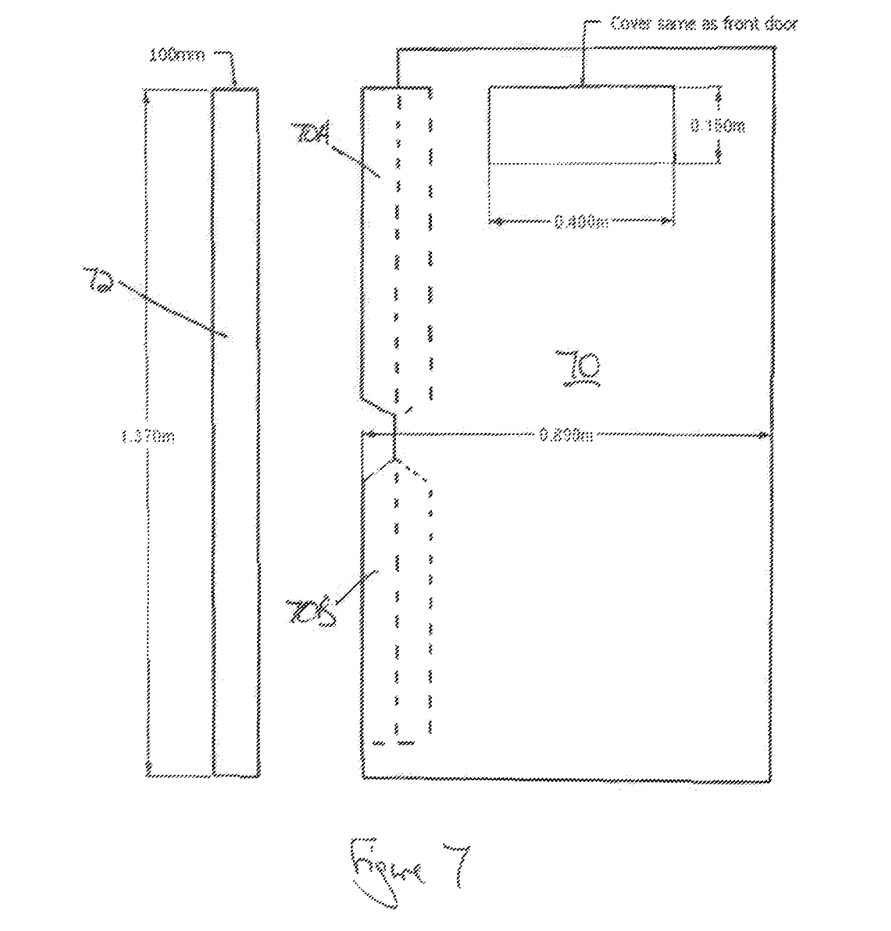
FIG. 7 shows an exploded view of a rear door side panel that is attachable to the base panel of FIG. 5.

FIG. 7 illustrates a rear door side panel 70 including cuffs 70A and 70B which are securable to the side edge of the rear door and a flap 72 which extends beyond the side edge of the rear door.

The base panel 50, front door side panel 58 and rear door side panel 70 are connected by hook and loop fasteners 51. It can be appreciated that these panels can be connected by other means including stitching and riveting.

Figure 8:
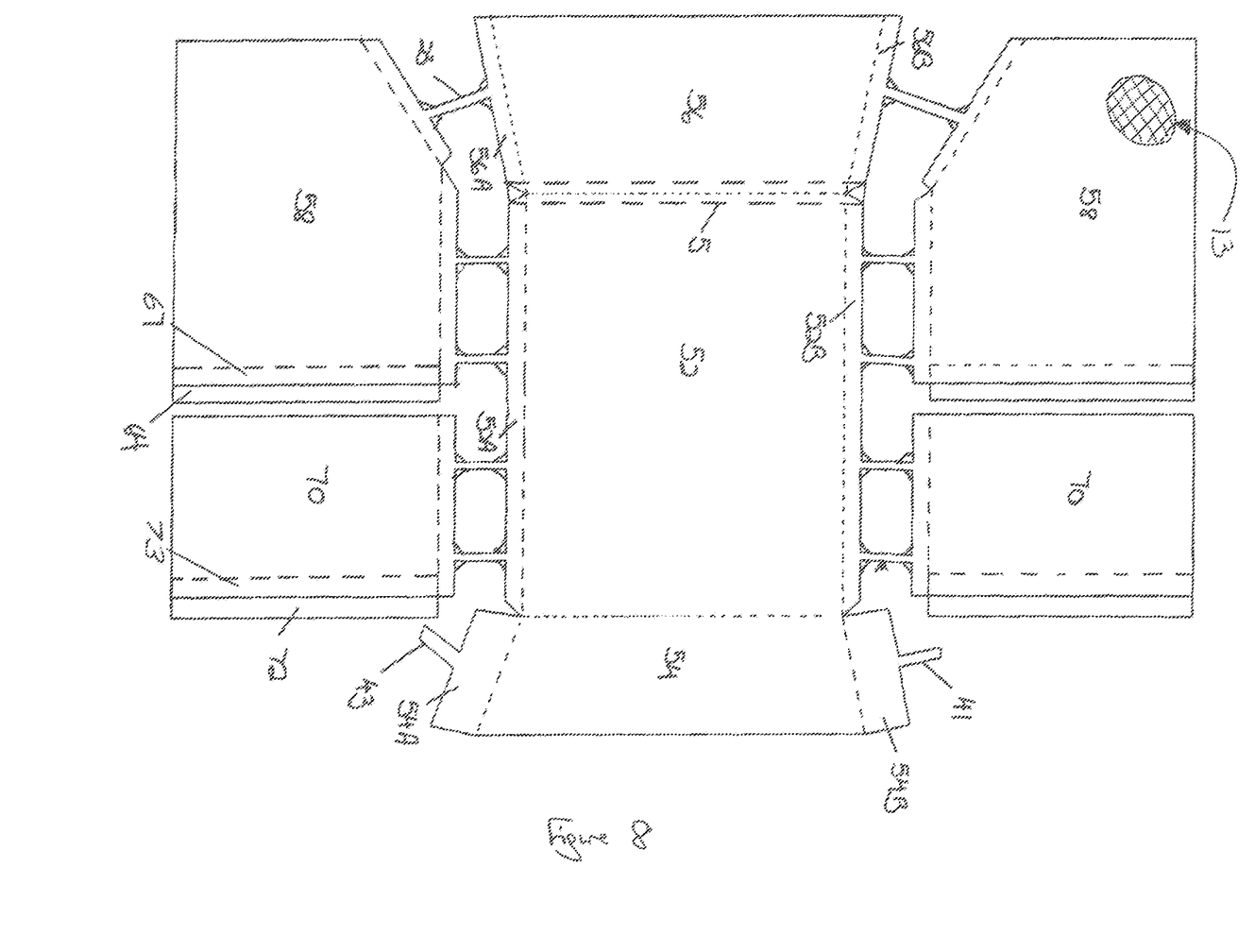
FIG. 8 shows a plan view of a base panel of the subject invention connected to the front door side panel of FIG. 6 and the rear door side panel of FIG. 7.

FIG. 8 illustrates a fire protection external vehicle cover including a base panel connected to the front door side panel of FIG. 6 and the rear door side panel of FIG. 7. The rear window panel 54 includes straps 41 and 43 which can be gripped between the door and door frame of the cabin of the vehicle to secure the panel to the vehicle. Front door side panel 58 includes overlapping flap 64 that is arranged to overlap the rear door side panel 70. The front door side panel 58 includes open cuff 67 that is arranged to extend inward of an outer face of the side panel and overlay the outer face of the side panel to form an elongate opening to receive edges of the vehicle door. Rear door side panel 70 includes overlapping flap 72 to overlap the rear cabin "C" pillar. The rear door side panel 70 includes open cuff 73 that is arranged to extend inward of an outer face of the side panel and overlay the outer face of the side panel to form an elongate opening to receive edges of the vehicle door. Gusset 5 connects front window panel 56 and base panel 52. The gusset improves flexibility of the cover by providing fold lines to allow the cover to fold and minimize stress on adjacent panels by increasing the distance between these panels to allow the cover to be folded without abutting the edges of the two panels.

Retention means 23 connects front window panel 56 and front door side panel 58.

Variations

It will of course be realised that while the foregoing has been given by way of illustrative example of this invention, all such and other modifications and variations thereto as would be apparent to persons skilled in the art are deemed to fall within the broad scope and ambit of this invention as is herein set forth.

In the specification the terms "comprising" and "containing" shall be understood to have a broad meaning similar to the term "including" and will be understood to imply the inclusion of a stated integer or step or group of integers or steps but not the exclusion of any other integer or step or group of integers or steps. This definition also applies to variations on the terms "comprising" and "containing" such as "comprise", "comprises", "contain" and "contains".

The invention claimed is:

1. A fire protection external vehicle cover that withstands being exposed to a temperature of at least 600° C. during part or the entire duration of a burn over event to protect occupants in a vehicle from physical injury or death for a minimum of 20 minutes from radiant heat, burning embers and flame impingement infiltrating the cover from a fire during a burn over event when the vehicle is stationary in the fire for the duration of the burn over event to protect occupants in a vehicle, the cover comprising:
   a plurality of reflective panels of a heat dissipating and/or thermal insulating material or textile; each panel configured to cover a portion of the cabin of a vehicle to provide protection, from radiant heat, burning embers and flame impingement from the wild fire contacting the reflective panels, to the occupants of the vehicle and to glass sections of the vehicle from shattering under intense heat when the vehicle is stationary in the fire for the duration of the burn over event, the plurality of panels including a base panel having dimensions that correspond to the roof of the vehicle cabin, one or more side panels having dimensions that correspond to the side of the vehicle cabin which are connected to opposing sides of the base panel, the side panels adapted to extend over opposed sides of the vehicle cabin such that the cover confirms to the shape of the cabin;
   a retention means, including straps or tags, which extends between and connects adjacent panels; the retention means are also extendible into the vehicle cabin between vehicle doors and door frames, and accessible by an occupant within the cabin to secure and adjust the panels against the cabin;
   storage and deployment means for storing and deploying the cover from one or more locations on the vehicle, wherein the storage deployment means comprises one or more containers mounted on a roof of the vehicle which stores the cover in a rolled up or folded up configuration;
   wherein, when deployed, the panels are secured to the cabin by an occupant within the cabin gripping the straps or tags between a closed door and a door frame of the cabin and the base panels and side panels are tensioned by tightening the straps or tags from within the cabin such that each panel contacts the cabin and can be held taut against the cabin by the retention means to minimize gaps between the cover and the cabin to form an enclosure,
   wherein at least one portion of the panels overlaps with a portion of another of the panels,
   wherein the heat dissipating and/or thermal insulating material or textile is constructed from a fiber reinforced material, and
   wherein the fibers of the fiber reinforced material include para-aramid synthetic fibers, glass fibers, carbon fibers, silica fibres or aramid fibers, ceramic fibres, vermiculite fibres or any combinations thereof.

2. The cover of claim 1, wherein at least one panel includes a flap that covers at least part of an adjacent panel.

3. The cover of claim 1, wherein at least one side panel includes an open cuff that is arranged to extend inward of an outer face of the side panel and overlay the outer face of the side panel to form an elongate opening to receive two or more edges of the vehicle door.

4. The cover of claim 1, wherein at least one side panel includes a flap that covers at least part of an adjacent panel and an open cuff that is arranged to extend inward of an outer face of the side panel and overlay the outer face of the side panel to form an elongate opening to receive two or more edges of the vehicle door such that the cover can be secured to the vehicle cabin using the cuff while the flap overlaps with an adjacent panel to provide protection between the panels.

5. The cover of claim 1, wherein at least one edge of the panels includes a gusset that connects to an adjacent panel.

6. The cover of claim 1, wherein the retention means extends between and is connected to the base panel and the side panel.

7. The cover of claim 1, wherein the retention means is connected to a flap or an open cuff extending from the base panel and the side panel.

8. The cover of claim 1, including openings to allow an occupant to see the external environment, wherein the cover further includes flaps to close the openings during a burn over.

9. The cover of claim 1, wherein the material or textile is a reflective single or multi-layered thermal insulating and/or heat dissipating fabric.

10. The cover of claim 1, wherein the material or textile includes a metallised layer.

11. The cover of claim 1, wherein the material or textile has a density ranging from 400 to 2,000 gsm.

12. The cover of claim 1, wherein the material or textile has a thickness ranging from 0.2 to 5 mm.

13. The cover of claim 1, wherein the base panel consists of a roof panel, front window panel and rear window panel.

14. The cover according to claim 1, wherein deployment of the cover is rapidly effected under gravitational means when the cover is released from the storage and deployment enclosures.

15. The cover according to claim 1, wherein the storage and deployment means includes a mechanical aid to effect rapid deployment of the cover.

16. The cover assembly according to claim 1 wherein the plurality of panels includes at least one side panel connected to an end of the base panel.

17. The cover assembly according to claim 15 wherein the mechanical aid includes a plurality of torsion springs.

18. The cover assembly according to claim 17 wherein the plurality of torsion springs have varying strengths and are configured to unfold the panels in a successive predetermined order from the base panel.

19. A fire protection external vehicle cover that withstands being exposed to a temperature of at least 600° C. during part or the entire duration of a burn over event to protect occupants in a vehicle from physical injury or death for a minimum of 20 minutes from radiant heat, burning embers and flame impingement infiltrating the cover from a fire during a burn over event when the vehicle is stationary in the fire for the duration of the burn over event to protect occupants in a vehicle, the cover comprising:

a plurality of reflective panels of a heat dissipating and/or thermal insulating material or textile; each panel configured to cover a portion of the cabin of a vehicle to provide protection, from radiant heat, burning embers and flame impingement from the wild fire contacting the reflective panels, to the occupants of the vehicle and to glass sections of the vehicle from shattering under intense heat when the vehicle is stationary in the fire for the duration of the burn over event, the plurality of panels including a base panel having dimensions that correspond to the roof of the vehicle cabin, one or more side panels having dimensions that correspond to the side of the vehicle cabin which are connected to opposing sides of the base panel, the side panels adapted to extend over opposed sides of the vehicle cabin such that the cover confirms to the shape of the cabin;

a retention means, including straps or tags, which extends between and connects adjacent panels; the retention means are accessible by an occupant within the cabin to secure and adjust the panels against the cabin;

storage and deployment means for storing and deploying the cover from one or more locations on the vehicle, wherein the storage deployment means comprises one or more containers mounted on a roof of the vehicle which stores the cover in a rolled up or folded up configuration;

wherein, when deployed, the panels are secured to the cabin by an occupant within the cabin gripping the straps or tags between a closed door and a door frame of the cabin and the base panels and side panels are tensioned by tightening the straps or tags from within the cabin such that each panel contacts the cabin and can be held taut against the cabin by the retention means to minimize gaps between the cover and the cabin to form an enclosure, wherein at least one portion of the panels overlaps with a portion of another of the panels, wherein the heat dissipating and/or thermal insulating material or textile is constructed from a fiber reinforced material, wherein the fibers of the fiber reinforced material include para-aramid synthetic fibers, glass fibers, carbon fibers, silica fibres or aramid fibers, ceramic fibres, vermiculite fibres or any combinations thereof, wherein the material or textile includes a metallized layer that reflects at least 70% of radiant heat, wherein the material or textile has a density ranging from 400 to 2,000 gsm, and wherein the material or textile has a thickness ranging from 0.2 to 5 mm.

* * * * *